Patented June 3, 1952

2,598,881

UNITED STATES PATENT OFFICE 2,598,881

WHOLE FRESH EGG SEMEN DILUTER

Victor R. Berliner, Somerville, N. J., assignor to Ortho Pharmaceutical Corporation, a corporation of New Jersey No Drawing. Application May 12, 1951, Serial No. 226,111

4 Claims. (Cl. 167—53.2)

This invention relates to a diluter for animal semen and particularly relates to a diluter for animal semen which is to be used for artificial insemination in domestic and fur-bearing animals.

Artificial insemination in domestic and fur-bearing animals has been practiced for a number of years; it was first practiced by using undiluted semen taken from farm animals such as bulls, rams, jacks, and stallions. Difficulties were encountered because it is necessary to use undiluted semen very soon after it is collected in order to achieve satisfactory results. In many instances it is necessary to transport semen considerable distances, and it is therefore necessary that the semen have keeping qualities and that the spermatozoa survive and have good motility over a period of several days. Artificial insemination did not achieve wide acceptance until adequate semen diluters were available because the breeding results were not consistent enough to justify the practice.

It was discovered in 1939 by Phillips that a semen diluter composed of egg yolk dispersed in a suitable buffer mixture increased the fertility and keeping qualities of the semen of most domestic animals, and this discovery contributed materially to the increase in the popularity and practice of artificial insemination of dairy cows. However, such a diluter must be stored before use at refrigerated temperatures and then retains its qualities as a diluter for only a short time, generally considered to be a maximum of two days. Semen stored in such a diluter keeps for a short time but rapidly loses its fertility and must be used within 2 to 4 days to insure satisfactory results. As a result of the poor storage performance of prior art diluters, the common practice has been to prepare fresh diluters each time a semen specimen is diluted. Many investigators have attempted to develop a semen diluter with better keeping qualities, and it has been universally accepted that egg yolk is a satisfactory ingredient, but that it is necessary to completely remove the white of the egg in order to obtain acceptable performance. It has been a generally accepted theory that egg white is detrimental to sperm life.

It is an object of this invention to prepare a semen diluter in which sperm have a markedly high survival for a period of at least 5 to 15 days with sufficient motility to perform fertilization.

It is another object of this invention to prepare a semen diluter in which a high proportion of the sperm remain viable and have a high incidence of survival over a period of at least 5 to 15 days.

It is still another object of this invention to prepare a semen diluter which may be stored for several months and longer at a temperature as high as 50° C. and still possess good sperm dilution and preservation properties.

It is another and further object of this invention to prepare a semen diluter with whole eggs in which sperm have a high incidence of survival with sufficient motility to perform fertilization over a period of at least 5 to 15 days.

It is another object of this invention to provide a semen diluter, free from spermicidal and sperm motility reducing substances, which diluter is prepared from whole fresh eggs in which sperm have a high incidence of survival with sufficient motility to accomplish fertilization of ova over a period of at least 5 to 15 days.

Other objects and a fuller understanding of the invention may be had by referring to the following description and claims taken in conjunction with the exemplary material.

It has now been discovered that a semen diluter may be prepared which contains as an ingredient both egg yolk and egg white and in the proportion in which they are found in eggs, and it has also been discovered that the gelatinous part of the egg white may be brought into uniform suspension or may be uniformly dispersed with the egg yolk and that the suspended or dispersed material forms a stable diluter when it is mixed with a suitable aqueous buffer solution.

It has been found preferable to pass the suspension or dispersion of whole egg in buffer solution, which is known as a raw diluter, through a suitable filter or strainer in order to remove coarse particles. This is an advantage because any coarse particles present have a tendency to settle out on standing and interfere with microscopic observation of sperm motility.

It is preferred that the filtered raw diluter be sterilized by heating in a water bath at a temperature of the said raw filtered diluter of 65° C. to 70° C. for one or more short periods on successive days; the preferred tempeature is 70° C. Two one-half hour heating periods on successive days have been found to completely sterilize the diluter solution.

In order that those skilled in the art may better understand how the present invention may be carried into effect, the following example is given by way of illustration and not by way of limitation.

The contents of 40 fresh eggs were passed through a colloidal mill set at .0004 of an inch distance between the rotor and stator for approximately 10 minutes. A smooth suspension or dispersion of the egg material was obtained which was mixed with four times its volume (8,000 cc.) of a buffer solution prepared by dissolving 238.4 grams (2.98%) sodium citrate, 80 grams (1.0%) dextrose, and 40 grams (0.5%) succinylsulfathiazole in sufficient distilled and filtered water to make the volume 8,000 cc. The raw diluter was passed through an 80 mesh silk screen. The filtered raw diluter was immediately placed in 10 cc. vials or bottles having 250 cc. capacity which were closed by rubber stoppers.

The filtered raw diluter was sterilized by keeping the vials or bottles in a 70° C. water bath for 30 minutes after the contents of the containers had reached the temperature of the said water bath. The containers were then removed from the water bath and held at room temperature for from 20 to 24 hours and then placed in the 65° C. water bath for an additional 30 minute period after the contents of the containers had reached the temperature of the said water bath. The sterilized diluter is stable at room temperature and retains its properties of sperm preservation even after storage at 50° C. for several months or more.

One heating period is satisfactory, but a more stable product is obtained by heating for at least two short periods. It is preferred that in one of the heating periods that the temperature is 70° C. as this produces a diluter in which there is no trace of precipitate on prolonged standing.

Silk screens of 60 to 100 mesh are preferred for filtering the raw diluter, but filters which have a flow rate for water of from 30 to 150 gallons/square foot/hour have been found satisfactory; and although asbestos disc filters such as a Seitz type filter are preferable, other filters which have a corresponding flow rate are satisfactory. Filtration may be accompanied with centrifugation or centrifugation may replace filtration.

Substances suitable for use as buffers are salts of organic or inorganic acids and are preferably sodium, potassium and sodium-potassium salts such as sodium sulfate, sodium potassium tartrate, sodium or potassium phosphate, sodium or potassium acetate, sodium or potassium citrate, and sodium or potassium lactate. Salts such as sodium or potassium chlorate, nitrate, bromate, and iodate are unsuitable for use in a semen diluter because they are toxic to spermatozoa.

It is preferred that sugars such as dextrose, fructose, galactose, and other monosaccharides be present in a semen diluter since they increase the life of spermatozoa; disaccharides may also be used but monosaccharides are preferred.

Semen from different species of animals must be buffered at different pH ranges, and it has been found that bovine semen must be buffered at a pH of from 6.3 to 6.9, ram semen at a pH of from 6.2 to 6.5, and stallion semen at a pH of from 6.5 to 7.2.

A 2.98% sodium citrate solution in distilled and filtered water gives a buffer which has a pH of 7.3; by adding 0.5% succinylsulfathiazole the pH is 6.4 to 6.5. This is satisfactory for bovine semen; other buffers which have a pH of from 6.3 to 6.9 may also be used in a diluter for bovine semen. Succinylsulfathiazole is added to the buffer solution since it contributes to the prevention of growth of bacteria and acts to suppress the metabolism of the sperm and thus increase the life and fertilization power of the said sperm. Other sulfa compounds may be substituted for succinylsulfathiazole, but it is preferable to use a sulfa having a sufficient solubility in water to be completely soluble when a corresponding amount is added. 9-amino acridine, antibiotics such as penicillin, streptomycin, and the like, may be substituted for succinylsulfathiazole or other sulfas.

Heat sterilization of the raw diluter contributes to its stability and storage time because it destroys harmful bacteria. Culture tests on bacteriological media of sterilized diluter were negative. Enzymes which contribute to the breakdown of protein matter in the diluter and thus shorten the life of the diluter were destroyed at 65° C. The length of time to which the raw diluter is exposed to the temperature of 65° C. to 70° C. may be varied, and the sterilization may be accomplished in one heating period, but it is preferred that two or more heating periods of approximately 30 minutes be used in sterilizing the raw diluter.

It will be seen from the above description and example of the invention that a sperm diluter has been prepared from which all coarse particles have been removed and which is stable at 50° C. for several months or more, an important advantage of the semen diluter of the invention being that animal semen may be diluted therewith and have a high survival, motility, and power to accomplish fertilization for a period of at least 5 to 15 days.

Only motile spermatozoa are capable of effecting fertilization and therefore it is important that a large proportion of spermatozoa remain motile during the time a semen specimen is stored in a diluter. The proportion of stored spermatozoa remaining motile decreases gradually with increase in storage time and in practice it has been found that semen samples from different bulls, stallions and jacks vary widely with respect to the proportion of spermatozoa retaining motility upon storage. It has been found and reported that semen stored in a diluter is superior to semen stored as collected from the animal, since diluters contain nutrient substances for the spermatozoa and are buffered to maintain a pH optimum for the life and consequent motility of spermatozoa. In the modern practice of artificial insemination it is often desirable and expedient to artificially inseminate with a semen specimen collected several days or even a week or more earlier and therefore, a diluter is most valuable in which the greatest proportion of spermatozoa will remain motile for the longest period of time.

The results below in tabular form show the per cent of motile spermatozoa, determined periodically by count under magnification, in semen samples stored in egg yolk and whole egg diluters for periods up to eight days. Semen specimens from six different bulls were each divided into two equal parts and one part of each specimen was added to ten parts by volume of egg yolk diluter and stored at a temperature of 5° to 10° C. while the other part was added to ten parts by volume of whole egg diluter and stored at the same temperature.

The whole egg diluter used in the tests was prepared according to the above example and contained whole eggs, sodium citrate, dextrose, and succinylsulfathiazole and was buffered at a pH of 6.5. The egg yolk dilute was prepared according to the above example except that it contained egg yolks free from egg white, sodium citrate, dextrose, and sulfanilamide in an amount equi-molar to the succinylsulfathiazole used in the said example. This diluter was buffered at a pH of 6.5.

| Diluter | | 24 Hrs. | 2 Days | 4 Days | 6 Days | 8 Days |
|---|---|---|---|---|---|---|
| Bull No. 1 | Egg Yolk | 80 | | 40 | 30 | |
| | Whole Egg | 80 | | 60 | 50 | |
| Bull No. 2 | Egg Yolk | 70 | | 20 | 20 | |
| | Whole Egg | 70 | | 50 | 50 | |
| Bull No. 3 | Egg Yolk | 70 | 40 | 20 | 20 | 20 |
| | Whole Egg | 80 | 80 | 80 | 70 | 60 |
| Bull No. 4 | Egg Yolk | 50 | 30 | 20 | 10 | 10 |
| | Whole Egg | 60 | 50 | 30 | 10 | 10 |
| Bull No. 5 | Egg Yolk | 50 | 20 | ¹1 | | |
| | Whole Egg | 70 | 50 | ¹30 | | |
| Bull No. 6 | Egg Yolk | 70 | 50 | ¹20 | | |
| | Whole Egg | 80 | 60 | ¹40 | | |

¹ 5 Days.

Although the invention has been described with a certain degree of particularity, it is to be understood that the present description has been made only by way of illustration and that numerous changes in the details of the procedure and composition may be resorted to without departing from the spirit and scope of the invention and that the said invention is not to be restricted or delineated in any way except by the following claims.

This application is a continuation-in-part of my U. S. Patent application, Serial No. 20,839, filed April 13, 1948 now abandoned.

What is claimed is:

1. A semen diluter free from spermicidal and motility reducing substances comprising a filtered and sterilized uniform dispersion of whole fresh egg in an aqueous solution, buffered at a pH within the range of from 6.2 to 7.2.

2. A semen diluter for bovine semen, free from spermicidal and motility reducing substances, comprising a filtered and sterilized uniform dispersion of whole fresh egg in an aqueous buffer solution buffered at a pH within the range of 6.3 to 6.9.

3. A semen diluter for ram semen, free from spermicidal and motility reducing substances, comprising a filtered and sterilized uniform dispersion of whole fresh egg in an aqueous buffer solution buffered at a pH within the range of 6.2 to 6.5.

4. A semen diluter for stallion semen, free from spermicidal and motility reducing substances, comprising a filtered and sterilized uniform dispersion of whole fresh egg in an aqueous buffer solution buffered at a pH within the range of 6.5 to 7.2.

VICTOR R. BERLINER.

REFERENCES CITED

The following references are of record in the file of this patent:

FOREIGN PATENTS

| Number | Country | Date |
|---|---|---|
| 477,272 | Great Britain | Dec. 20, 1937 |

OTHER REFERENCES

Journal of Biol. Chem., vol. 130, page 415.

Phillips, Jour. of Dairy Sci., May 1940, pp. 399 to 404.

Salisbury, Jour. of Animal Sci., vol. 4, pages 270 to 276. (August 1945.)